United States Patent
Sowul et al.

(10) Patent No.: US 8,300,284 B2
(45) Date of Patent: Oct. 30, 2012

(54) APPARATUS AND METHOD FOR PATTERN-BASED CONFIGURATION OF OPTICAL SENSING SYSTEMS

(75) Inventors: Adam Sowul, Sunnyvale, CA (US); Alejandro Ruiz Sanchez, Newark, CA (US)

(73) Assignee: Omron Scientific Technologies, Inc., Fremont, CA (US)

( * ) Notice: Subject to any disclaimer, the term of this patent is extended or adjusted under 35 U.S.C. 154(b) by 545 days.

(21) Appl. No.: 12/580,469

(22) Filed: Oct. 16, 2009

(65) Prior Publication Data

US 2010/0097665 A1 Apr. 22, 2010

Related U.S. Application Data (60) Provisional application No. 61/107,490, filed on Oct. 22, 2008.

(51) Int. Cl.
*H04N 1/04* (2006.01)
(52) U.S. Cl. ........ 358/475; 358/474; 358/509; 382/181; 382/173; 356/141.5
(58) Field of Classification Search .................. 358/474, 358/475, 509, 514; 382/181, 173, 135, 112, 382/137; 356/141.5, 142, 71, 359
See application file for complete search history.

(56) References Cited

U.S. PATENT DOCUMENTS

| | | | |
|---|---|---|---|
| 4,464,566 A * | 8/1984 | Silverman et al. | 235/382 |
| 4,599,509 A * | 7/1986 | Silverman et al. | 235/382 |
| 5,190,632 A * | 3/1993 | Fujimiya et al. | 204/608 |
| 5,475,766 A * | 12/1995 | Tsuchiya et al. | 382/144 |
| 5,623,609 A * | 4/1997 | Kaye et al. | 704/1 |
| 6,356,658 B1 * | 3/2002 | Sezan et al. | 382/209 |
| 6,493,653 B1 * | 12/2002 | Drinkard et al. | 702/176 |
| 6,678,402 B2 * | 1/2004 | Jones et al. | 382/135 |
| 6,753,776 B2 * | 6/2004 | Drinkard | 340/540 |
| 7,068,364 B2 * | 6/2006 | Sugihara et al. | 356/237.5 |
| 7,256,874 B2 * | 8/2007 | Csulits et al. | 356/71 |
| 7,282,060 B2 * | 10/2007 | DeBenedictis et al. | 607/88 |
| 7,619,721 B2 * | 11/2009 | Jones et al. | 356/71 |
| 7,817,842 B2 * | 10/2010 | Mennie | 382/137 |
| 7,873,576 B2 * | 1/2011 | Jones et al. | 705/43 |
| 8,028,909 B2 * | 10/2011 | Brock et al. | 235/438 |
| 2010/0127078 A1 * | 5/2010 | Brock et al. | 235/438 |

FOREIGN PATENT DOCUMENTS

| | | |
|---|---|---|
| DE | 19737393 A1 | 3/1999 |
| DE | 102005003254 A1 | 8/2006 |
| DE | 102005063217 A1 | 7/2007 |
| DE | 102007044679 B3 | 11/2008 |

* cited by examiner

*Primary Examiner* — Negussie Worku
(74) *Attorney, Agent, or Firm* — Murphy, Bilak & Homiller, PLLC (57) ABSTRACT

According to a method and apparatus taught herein, an optical sensor uses pattern recognition in its optical detection processing to "see" detection patterns that correspond to predefined configuration settings. In one embodiment, for example, an optical sensing system selects an operational configuration by detecting a pattern embodied in received light data and comparing the detected pattern to one or more internally stored patterns. Each stored pattern represents a different operational configuration of the optical sensing system. If the detected pattern matches one of the stored patterns, the optical sensing system adopts the operational configuration corresponding to the matched stored pattern. Further, in one or more embodiments, the optical sensing system enters a configuration mode by an external stimulus, e.g., responsive to a configuration mode input, and the aforementioned pattern detection-based configuration selection is enabled only while in the configuration mode.

34 Claims, 6 Drawing Sheets

|  |  | Side A | | | | Side B | | | |
| --- | --- | --- | --- | --- | --- | --- | --- | --- | --- |
|  |  | OCP 1A | OCP 2A | OCP 3A | OCP 4A | OCP 1B | OCP 2B | OCP 3B | OCP 4B |
| Start Sector | | 0 | 0 | 0 | 0 | 0 | 0 | 0 | 0 |
| | | 1 | 1 | 1 | 1 | 0 | 0 | 0 | 0 |
| Coding Sector | | 1 | 0 | 1 | 0 | 1 | 1 | 0 | 0 |
| | | 1 | 1 | 0 | 0 | 1 | 0 | 1 | 0 |
| Stop Sector | | 0 | 0 | 0 | 0 | 1 | 1 | 1 | 1 |
| | | 0 | 0 | 0 | 0 | 0 | 0 | 0 | 0 |
| | | | | | | | | | |
| Interpretation 1 | | Option A | Option B | Option C | Option D | Option A | Option B | Option C | Option D |
| Interpretation 2 | | Option A | Option B | Option C | Option D | Option E | Option F | Option G | Option H |
| Interpretation 3A | | Option A Enabled | Option B Enabled | Option C Enabled | Option D Enabled | Option A Disabled | Option B Disabled | Option C Disabled | Option D Disabled |
| Interpretation 3B | | Option A True | Option B True | Option C True | Option D True | Option A Inverse | Option B Inverse | Option C Inverse | Option D Inverse |

*TABLE 1: EXAMPLE OF 6 BEAM OCP*

APPARATUS AND METHOD FOR PATTERN-BASED CONFIGURATION OF OPTICAL SENSING SYSTEMS

RELATED APPLICATIONS

This application claims priority from the U.S. provisional patent application identified by App. No. 61/107,490, which was filed on 22 Oct. 2008.

TECHNICAL FIELD

The present invention generally relates to optical sensing systems, such as light curtains and laser scanners, and particularly relates to pattern-based configuration of such systems.

BACKGROUND

Optical sensing systems often find use in machine guarding and area monitoring applications, although they are not limited to such applications. Regardless of the general application, a specific sensor installation generally requires the selection of one or more configuration options. Such options include choices about how the sensor behaves at start-up, or upon reset, how it behaves responsive to detection events, etc.

The selections made for the configurable operating parameters define the overall configuration of the sensor system. At least some types of parameters are changed infrequently. For example, parameters defining how a given sensor system should behave at startup may be set as part of initial installation, and then left unchanged. It is known, for example, to provide sensor systems with DIP switches, jumper circuits, etc., that allow an installer or authorized user to make static configuration selections. However, DIP switches are expensive and hard to include in a mechanical design so that the ingress protection (IP) ratings are maintained. Moreover, the possible configuration settings available from DIP switches are practically limited, particularly where safety-critical switch redundancy is required. In addition, it is difficult to add new features to DIP switch configurations without changing hardware.

It is also known to provide electronic configuration devices that couple to sensor systems and allow configuration settings to be downloaded to the system from the configuration devices or otherwise selected using them. However, many users need to configure their optical sensing systems very rarely and thus they do not want to incur the cost or hassle of complex external programming devices. In still other approaches, systems are factory pre-configured systems to tailor them to given customer needs.

SUMMARY

According to a method and apparatus taught herein, an optical sensor uses pattern recognition in its optical detection processing to "see" detection patterns that correspond to predefined configuration settings. In one embodiment, for example, an optical sensing system selects an operational configuration by detecting a pattern embodied in received light data and comparing the detected pattern to one or more internally stored patterns. Each stored pattern represents a different operational configuration of the optical sensing system. If the detected pattern matches one of the stored patterns, the optical sensing system adopts the operational configuration corresponding to the matched stored pattern. Further, in one or more embodiments, the optical sensing system enters a configuration mode by an external stimulus, e.g., responsive to a configuration mode input, and the aforementioned pattern detection-based configuration selection is enabled only while in the configuration mode.

However, the present invention is not limited to the above summary of features and advantages. Indeed, those skilled in the art will recognize additional features and advantages upon reading the following detailed description, and upon viewing the accompanying drawings.

DETAILED DESCRIPTION

According to teachings in this disclosure, an optical sensing system uses its sensing capability to recognize specific patterns in received light data introduced into a scanning area. The recognized patterns are compared to one or more stored patterns that correspond to specific configuration settings. The method and apparatus described herein have broad applicability to various types of optical sensing systems, such as a range of active optoelectronic devices. For example, while not limiting applications, the method and apparatus may be particularly advantageous for use in light curtains, laser scanners, or other optical sensing systems that are configured to analyze the "status" of a guarded or monitored area.

Broadly, the optical configuration method described herein is based on pattern recognition. Pattern recognition aims to classify patterns based on either a priori knowledge or on statistical information extracted from the patterns. In one or more embodiments, the method described herein uses a priori knowledge as a reference point.

The pattern used to configure a light curtain or other optical sensing system is called an Optical Configuration Pattern (OCP). In one embodiment, an Optical Configuration Pattern is a mechanical combination of transparent and opaque areas. The combination uniquely represents a given operating configuration, and allows a light curtain or other optical sensing system to be configured in a particular way when it recognizes the pattern while being in a particular configuration mode. For example, when presented with one particular pattern, a light curtain can change its range setting from short range into long range.

Figure 1:
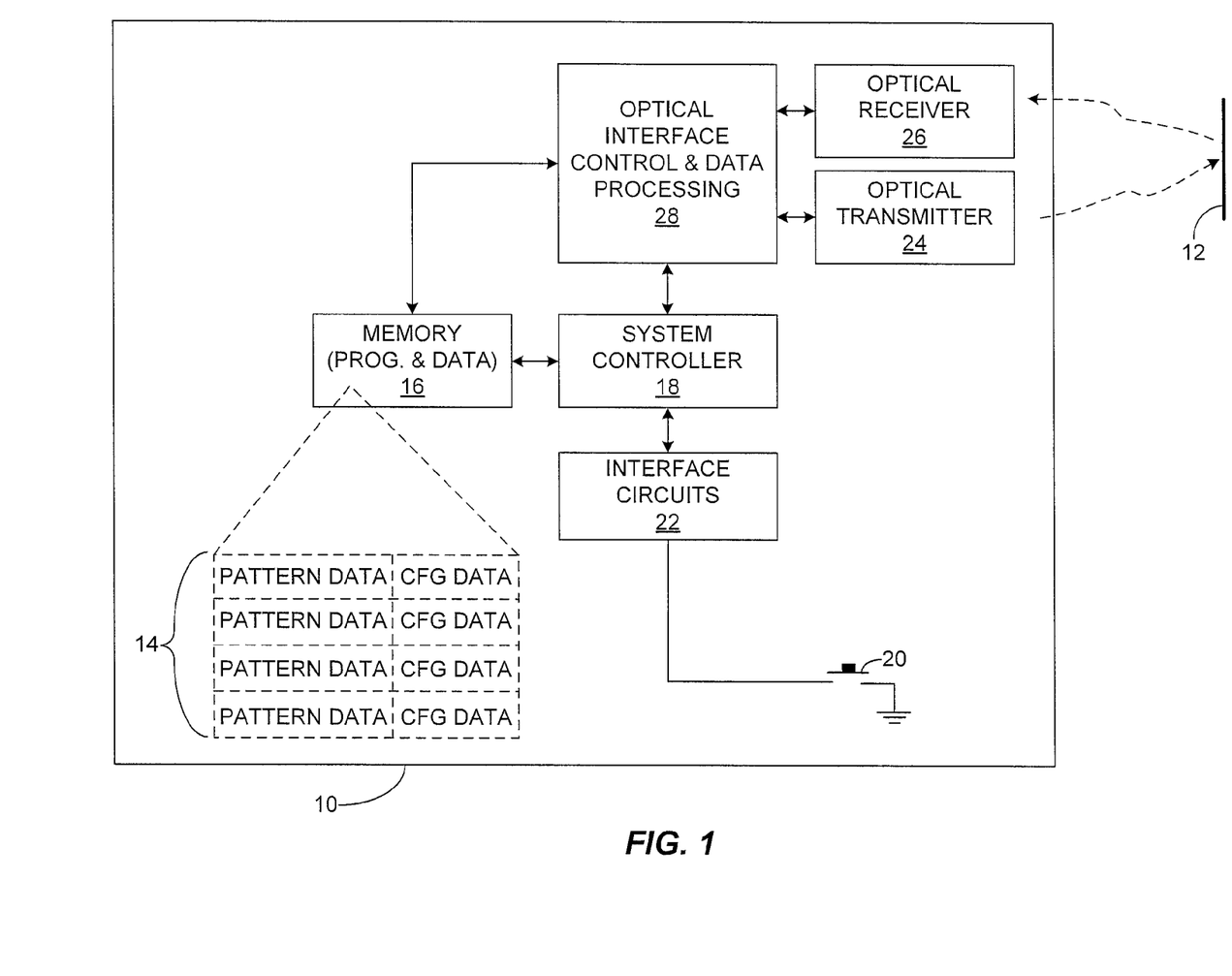
FIG. 1 illustrates one embodiment of an optical sensing system that is configured for optical pattern recognition-based configuration.

FIG. 1 illustrates one embodiment of an optical sensing system 10, whose operating configuration parameters can be changed or otherwise updated by presenting it with one or more predefined OCPs. By way of non-limiting example, the optical sensing system 10 may be a type of laser scanner, such as those illustrated and described in U.S. Pat. No. 6,493,653 to Drinkard et al, and U.S. Pat. No. 6,753,776 to Drinkard. The illustrated embodiment of the optical sensing system 10 is configured to emit light, e.g., pulsed laser beams or infrared light beams, and to receive return reflections. By processing the return reflection signals, the system 10 performs one or more functions, e.g., detects objects, measures distances, etc. Advantageously exploiting this basic detection capability, the system 10 is configured to detect patterns in the received light data, e.g., while in a configuration mode of operation.

In more detail, an operator or installer places an optical pattern card 12 in the system's field of view, and the system 10 detects the card's OCP as embodied in the light reflection data generated within the system 10 from detecting the card 12. The system 10 stores, for example, a pattern/configuration table 14 in memory 16, where each stored OCP is married with one or more configuration parameter settings or values.

A system controller 18 is configured to obtain received light data or derived data, and evaluate it to see whether it embodies a pattern matching one of the OCPs stored in the table 14. If there is a match, the system controller 18 reads in the configuration data stored in correspondence to the matched OCP, and updates one or more of the system's configuration parameters accordingly.

In one embodiment, the operator presses a configuration button or switch 20, to place the system 10 into a configuration mode, wherein it performs the pattern recognition based configuration updating. The system controller 18, e.g., a microprocessor-based circuit, interfaces to the switch 20, e.g., through an interface circuit 22, which may provide a plurality of additional input/output circuits for the system 10. As for the received light data, the system 10 includes an optical transmitter 24 to emit light and an optical receiver 26 to receive return (reflected) light. The system 10 further includes optical interface, control, and data processing circuits 28 to control the optical receiver/transmitter, and process received light data.

The received light data may comprise intensity measurements, peak measurements, pulse-related measurements, present/absent digital representations, and/or derived data, such as distance measurements. In any case, the system controller 18 performs pattern recognition on such data, to determine whether it embodies any one of the stored OCPs that are used to change operating configuration parameters.

Figure 2:
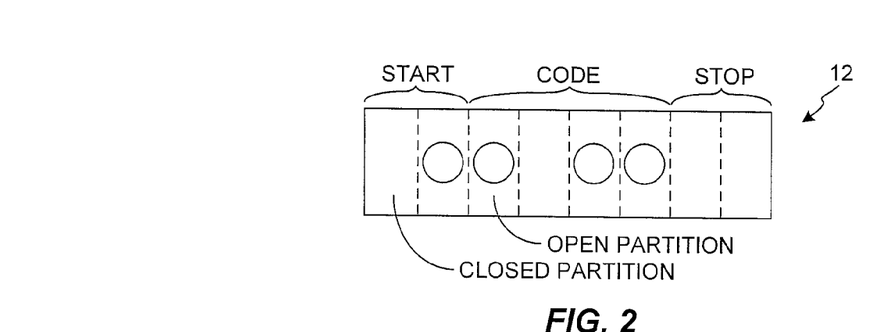
FIG. 2 illustrates one embodiment of an optical pattern card or device, for use with the optical sensing system of FIG. 1.

In a laser scanner embodiment of the system 10, which measures distances based on emitting light pulses and timing corresponding return reflections, the pattern card 12 may comprise a set of blocked or open partitions (see FIG. 2). With that implementation, light beams from the system 10 are returned from the facing surface of the card (blocked partition), or from objects behind the card (open partition). In fact, depending on what is behind an open partition, the system 10 may receive no return light at all. Regardless, the distance measurements obtained by the system 10 will vary markedly between open and blocked partitions, and the distances can be quantized or otherwise recognized by the system 10 as a binary pattern of blocked/unblocked values for comparison to OCPs in the table 14. In another embodiment, the pattern is formed using partitions of different reflectivities—e.g., black and white partitions—and the system 10 is configured to detect corresponding variations in the returned reflections. For example, it detects a characteristic pattern of variations in reflection intensity. (The intensity measurements or the deltas between such measurements may be quantized by the system 10, to obtain a binary pattern.)

Figure 3:
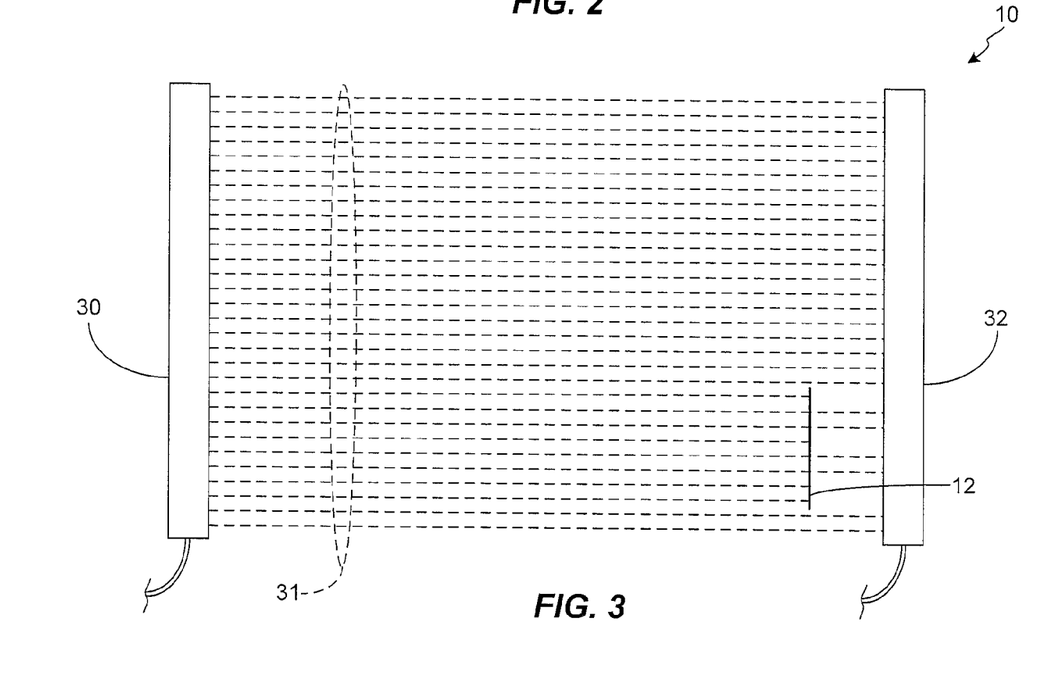
FIG. 3 illustrates another embodiment of an optical sensing system that is configured for optical pattern recognition-based configuration.

FIG. 3 illustrates another embodiment of the system 10, here implemented as a "light curtain" comprising a transmitting unit 30 and a receiving unit 32. The previously illustrated circuitry of FIG. 1 may be split between the units 30 and 32, perhaps with some duplication between them (e.g., each unit may have its own microprocessor-based circuits, interface circuits, etc.), or consolidated between them (e.g., in a shared "control" unit).

Such light curtain architectural details are not directly relevant to the pattern recognition based configuration functions discussed herein, but those skilled in the art will appreciate that the pattern recognition function uses received light data. Therefore, if the units 30 and 32 operate independently, the pattern recognition functionality is implemented within the circuitry of the receiving unit 32. On the other hand, if there is communication between the two units, or if they share centralized processing circuitry, the pattern recognition function can be implemented in either unit, or at a central controller. Further, those skilled in the art will appreciate that the light curtain embodiment of FIG. 3 operates based on direct transmission of light from the transmitting unit 30 to the receiving unit 32, so optical and related processing circuit implementations differ for the system 10 as compared to the reflection-based implementation used in the laser scanner embodiment shown in FIG. 1.

With that point in mind, one sees in FIG. 3 that the transmitting unit 30 emits a plurality of light beams 31 (from a plurality of light transmitters that are not explicitly shown). The receiving unit 32 includes a corresponding plurality of light receivers, and the receiving unit 32 is installed such that beam alignment exits between each corresponding pair of light transmitter and light receiver. In this context, the pattern card 12 is disposed between the two units, such that the pattern card 12 causes a characteristic pattern of blocked/unblocked light beams at the receiving unit 32, which is detected and compared to stored OCPs to evaluate whether there is a match.

Figure 4:
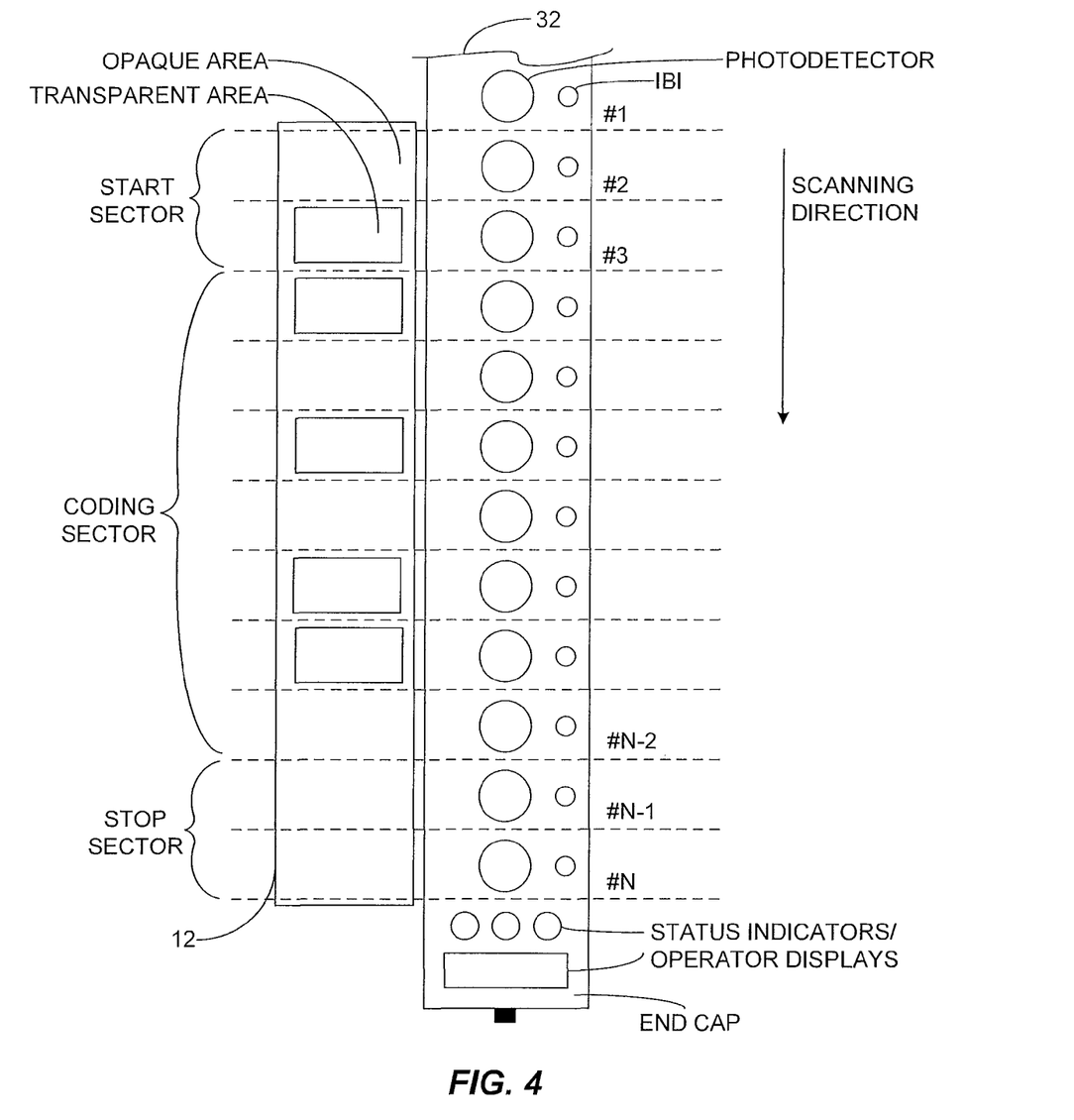
FIG. 4 illustrates one embodiment of a light curtain optical sensing system, and one embodiment of an optical pattern card or device used to present an optical configuration pattern to the sensor.

In more detail, FIG. 4 illustrates another light curtain (LC) embodiment and an OCP card. The pattern generally consists of three characteristic sectors: start, coding, and stop sectors. The LC uses start and stop sectors to recognize the orientation of the OCP. In this particular example, both sectors are two beams long (mechanical dimensions of opaque and transparent areas are strictly with the beam spacing of the LC). The 'start sector' has one opaque and one transparent one beam long area. The 'stop sector' is completely opaque (two beams long area). The middle sector, which is called a "coding sector," contains an appropriate coding pattern and it is N-4 beams long (where N is a total length of the OCP using LC beams as a fundamental unit).

As one point of consideration, a given light curtain may be one in a "family" of light curtains. Each member of the family may have a different length and, correspondingly, a different number of light transmitters and light receivers. OCP cards 12 designed for such a family of light curtains generally would not have overall "lengths" greater than the number of beams available in the shortest LC within the family. As a related consideration, the beam spacing generally is the same across all light curtains in a LC model family. However, beam spacing can change within a given family, and likely will change across different model families. Some LCs are meant to be "finger" safe, for example, meaning they have relatively close beam spacing, while others are designed for coarser detection capability. In this regard, OCP cards 12 can be designed for a particular beam spacing, to match one or more families of LCs that use that beam spacing, or can be designed with a spacing that matches a base beam spacing and one or more multiples of that spacing so they all can use it.

Figure 5A:
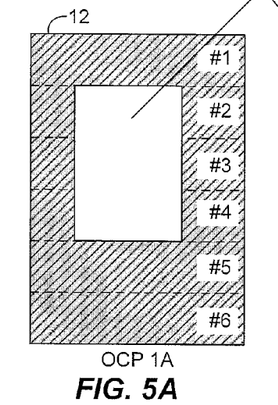
FIGS. 5A/5B-8A/8B illustrate example combinations for six-beam long optical configuration patterns.

FIGS. 5A/5B-8A/8B illustrate example combinations in a six beam long OCP. In these examples, the start sector is labeled as areas #1 and #2, the coding sector is labeled as areas #3 and #4 and the stop sector is labeled as areas #5 and #6. Note in the figure that even though the OCPs are one-dimensional and flipping them sideways does not change the presented pattern, they can be positioned in two different ways by flipping them upside down, i.e., turning them around 180 degrees. As such, one embodiment of an OCP card 12 includes orientation indicia printed, embossed, or otherwise carried thereon.

Figure 5B:
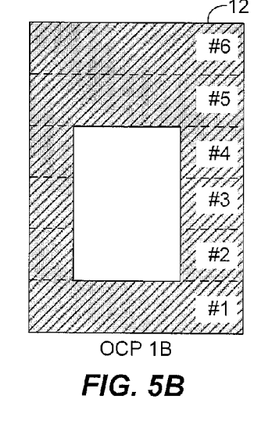
Figure 6A:
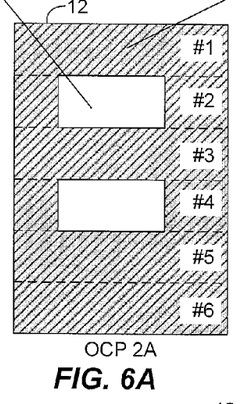
Figure 6B:
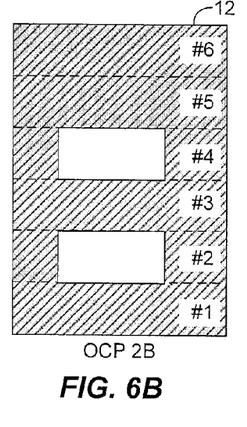
Figure 7A:
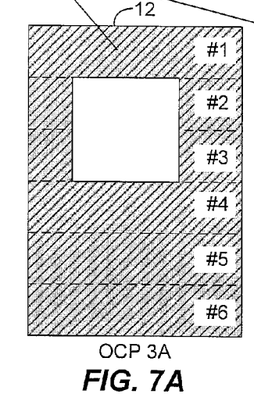
Figure 7B:
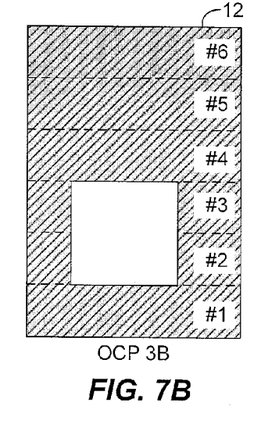
Figure 8A:
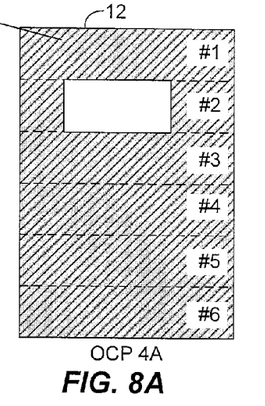
Figure 8B:
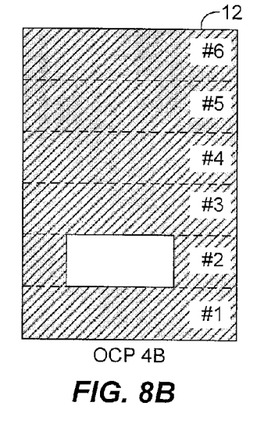
Figure 9:
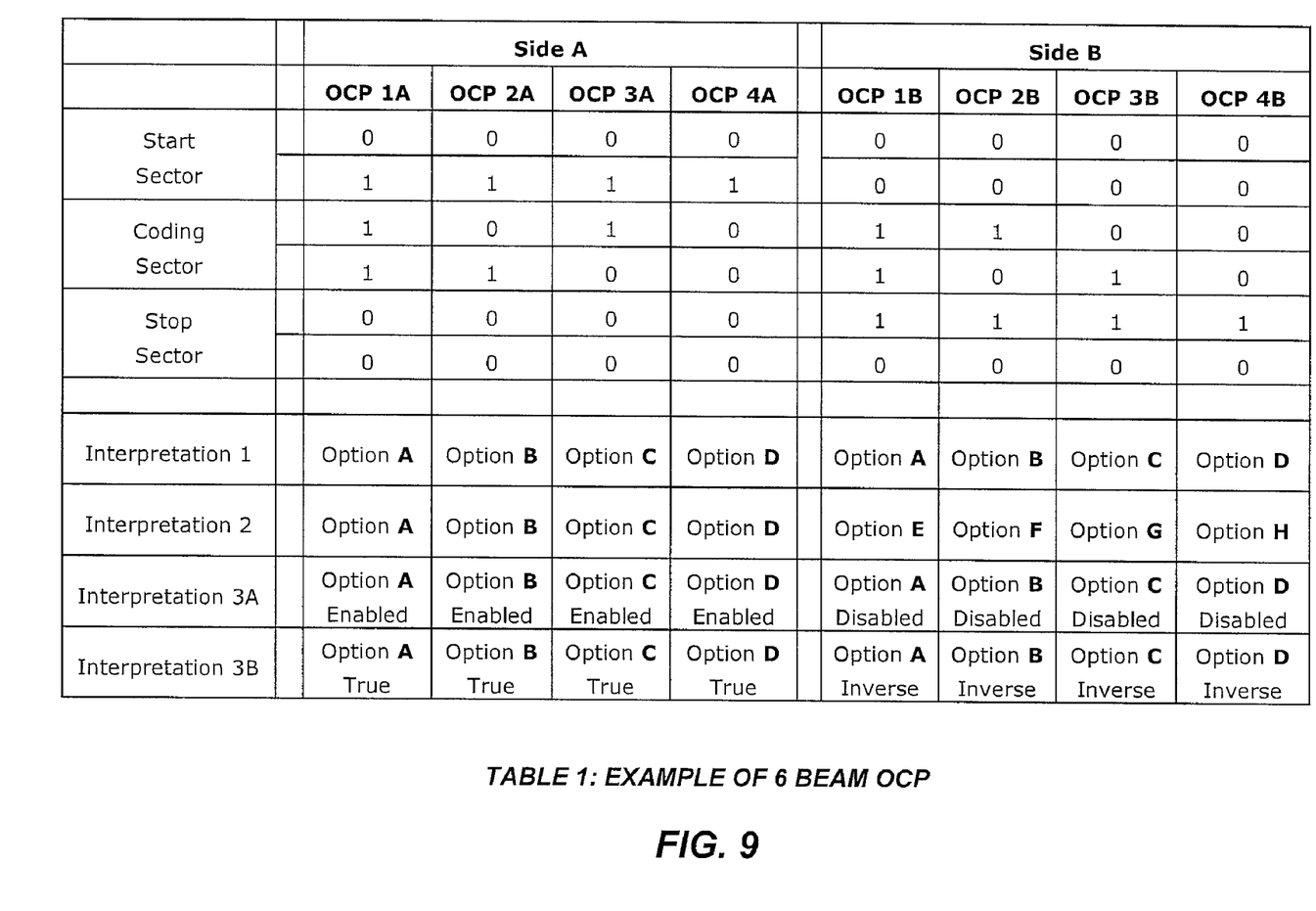
FIG. 9 is a table of Optical Configuration Pattern (OCP) combinations.

In one or more embodiments, the configurations and pattern placements shown in FIGS. 5A/5B-8A/8B have several possible interpretations as further described in Table 1, provided in FIG. 9. In at least one embodiment, the system 10 is configured to use a first logical interpretation (labeled as "Interpretation 1," in Table 1), in which every OCP has the same meaning regardless of its orientation. So, OCP 1A and OCP 1B, as shown in FIGS. 5A and 5B, for example, are interchangeable.

In another embodiment, the system 10 is configured to use a second logical interpretation (Interpretation 2), in which the orientation of the OCP matters. As such, OCP 1A is distinct from 1B, 2A is distinct from 2B, and so on. Thus, an appropriately configured LC would treat OCP 1A and OCP 1B as different independent patterns that effect different configuration choices.

In another embodiment, the system 10 is configured to use a third logical interpretation (Interpretation 3A), wherein the "A" orientation pattern and the "B" orientation pattern are correlated to each other by the system 10. Thus, the system 10 treats the code from side A of a pattern card logically like ENABLE "something" and code from side B like DISABLE "something." (For example, "something" is some action or behavior of the system 10 that can be turned on or off, as desired.)

In a variation of this third interpretive logic (Interpretation 3B), one or more embodiments of the system are configured to treat codes from side A and side B as complementary redundant codes that must be entered in a sequence. This interpretation logic is particularly advantageous for safety systems, which require a redundant configuration process, because it reduces the risk of accidental reconfigurations by adding a "double check" to the process. For example, this type of redundant true/inverse process would detect discrepancies caused by an operator accidentally altering the code pattern of an OCP card 12 with one or more of his or her fingers.

Referring to Table 1, one sees that under Interpretation 3B, in at least one embodiment, the user would present an OCP card 12 in one orientation to a LC or other optical sensor system 10, which reads the OCP 12 in that first orientation, but then must see the inverse orientation of the same OCP 12 before recognizing the attempted configuration change as valid. Further, it should be understood that the logical interpretation used by the system 10 can be pre-programmed for the system 10, or can be configurable.

Further, the optical sensing system 10 in one or more embodiments contemplated herein is advantageously configured to assist the operator during such a configuration process. For example, in response to an operator attempting to enter configuration mode, the system 10 may blink a visual indicator or provide some other indication that it has entered configuration mode. Then, the system 10 provides some positive indication that it has successfully read an OCP 12 in its first orientation and is waiting to see the inverse orientation, e.g., an indicator light goes from blinking to solid and then back to blinking, or one or more indicator lights change colors, or different ones in a plurality of indicator lights are illuminated or extinguished.

Figure 10:
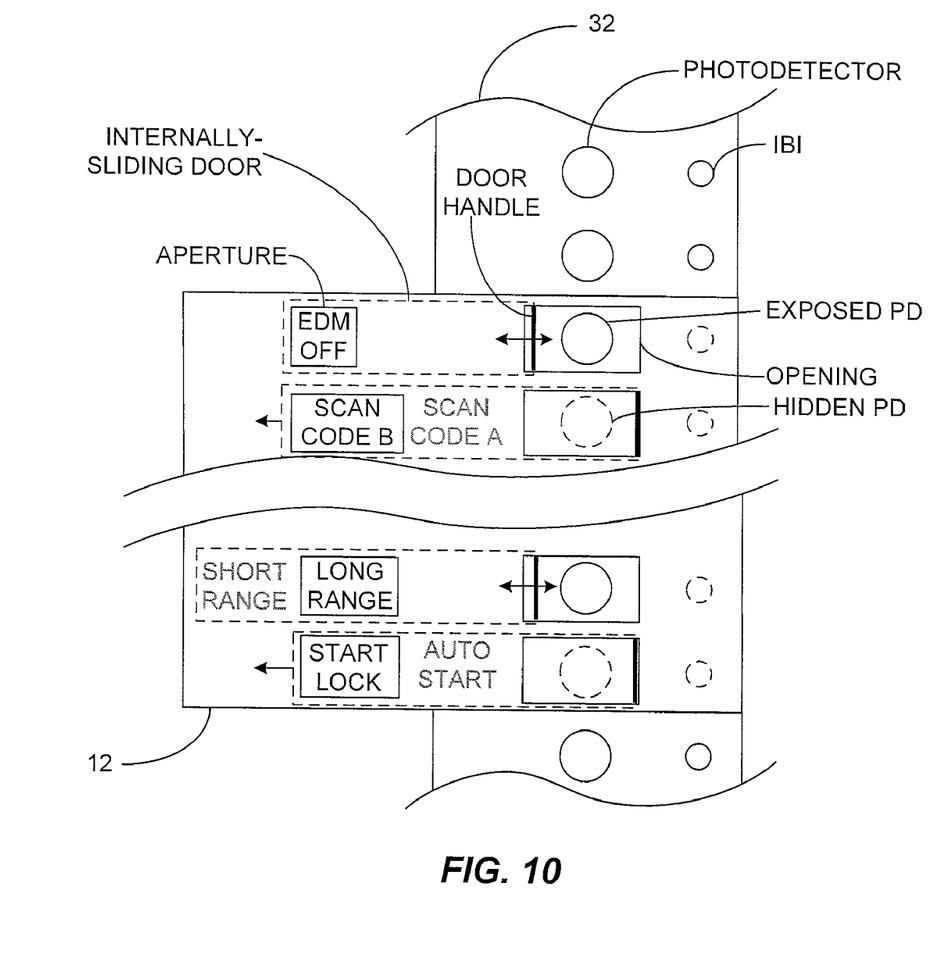
FIG. 10 illustrates one embodiment of a card with one or movable elements, e.g., sliding doors, flaps, or movable apertures, that provide for selectable configuration patterns.

Physically, each defined OCP could be an individual card on a keychain with the pattern configuration written on it. For example, a 'hard-coded' pattern card may represent possible factory defaults. Additional cards having other pattern configuration combinations may be used to correspond to various configuration settings. However, due to the number of combinations, it may be more convenient to have a single card with flip doors or slide doors that allow for manual opening or closing of the aperture as shown in FIG. 10. An OCP card 12 that provides a Variable Configuration Pattern would have writing or other indicia on it to clearly describe or otherwise convey the effect of every individually variable flap, door, or slide. Effectively, the variable patterning available with this type of OCP card 12 allows one OCP card 12 to input any one of a number of OCPs to a given optical sensing system 10.

In at least one embodiment, pattern cards 12 are printable by a user. For example, software for printing defined patterns is provided, allowing an end user to print out patterns on paper or other media. As an example, for blocked/unblocked patterns, the print-out would include markings for those areas to be cut out or removed by the user. As another example, for reflectivity patterns, the printout may use black and white areas, or even grayscale areas.

Also, it is known to provide "Individual Beam Indicators" on optical sensing systems 10. See, for example, U.S. Pat. No. 5,302,942 to Blau, which gives a non-limiting example of beam indicators in a light curtain embodiment. Also, see the previously mentioned U.S. Pat. No. 6,753,776 to Drinkard, which illustrates beam indicators in a laser scanner embodiment.

At least for light curtain embodiments, when Individual Beam Indicators (IBIs) are used in the optical sensing system 10, one or more embodiments of the OCP card 12 has punched holes that allow the IBIs to be seen through the pattern card. In other words, the operator can align the OCP card 12 against the light curtain receiver's face (e.g., the optical receiving face of the receiving unit 32 in FIG. 3) by placing the IBI apertures in the OCP 12 in alignment with the IBIs on the receiving unit 32. Doing so ensures alignment and provides direct visual feedback to the operator of the pattern being used.

In any case, the process of configuring the settings of an LC embodiment of the optical system 10 in one or more embodiments comprises placing an OCP card 12 between the receiver and transmitter. The LC is then placed into configuration mode so that it senses the OCP and tries to match the scanned pattern with one of the known patterns from its memory. If the LC successfully recognizes the pattern, the LC confirms recognition of the pattern to the user and saves the configuration settings to its non-volatile memory.

To enter program mode a pushbutton may be used. In a "safety" LC, to avoid accidental reconfigurations, the pushbutton access could be restricted to non-authorized users by placing it inside an end cap or other restricted access port, or by requiring a key-locked switch to be used. Also, for redundancy and to avoid configuration errors (such as blocking a beam with a finger while holding the pattern) the process could require two presses of the configuration button either with the true/inverse pattern as explained above or by repeating the pattern location and programming twice. Also, it is contemplated herein to use a "master" OCP card 12 in one or more embodiments, which can be presented to an optical sensing system 10 as an "authorization" pattern that must be read in first, to enter configuration mode and/or as a precursor to presenting an actual configuration-changing pattern.

Regardless, because alignment of the pattern with the LC is important, a preferred method is to vertically align the OCP 12 with an end cap or other reference position on the optical receiving face of the LC receiver (e.g., with respect to one end or other reference position on the receiving face of the receiving unit 32 in FIG. 3). On the other hand, reference positioning becomes less critical on longer LCs, which have more beams available for use in detecting the OCP 12. It should be understood that one or more LC embodiments of the optical sensing system 10 are configured to recognize patterns along a given set of beams, and thus require OCP cards 12 to be placed in alignment with that set of beams. An LC receiving unit 32 can, for example, carry indicia serving as OCP card alignment marks. In other LC embodiments of the optical sensing system 10, pattern recognition is enabled along the length of the LC, meaning that any subset of beams can be used for OCP. This approach is useful, for example, because a customer could successfully carry out OCP-based configuration of the LC, even if one or more of its beams (transmitter or receiver) are burnt-out or otherwise inoperative.

Also, because a user could use an OCP card from a previous LC generation, care must be taken when upgrading firmware versions or creating LC new models with different configuration parameters. One way to prevent unintended configuration selections is to increase the size of the OCP used with the newer LC models, so that older LCs won't be able to recognize OCP cards made for newer LC models, while still allowing the newer LC models to read older-model OCP cards (if desired), as well as the extended patterns of the newer-model OCP cards.

In one non-limiting embodiment, the predicted maximum size of the pattern is limited by the minimum size of the LC the OCP card is intended to work with. OMRON SCIENTIFIC TECHNOLOGIES, INC. (OSTI) manufactures and sells a number of light curtain models and model families. For OSTI's MS4800 system, the minimum size of an OCP is 12 beams. If four beams are used for start and stop configurations, eight beams are available for pattern configuration combinations. Using Interpretation 1 described above, an eight-beam configuration pattern has $2^8$ or 256 possible pattern combinations. Using Interpretation 2 described above in which the orientation of the pattern is also detected, an eight-beam configuration pattern has $2 \times 2^8$ or 512 possible pattern combinations.

Also, as previously noted, optical sensing systems with different resolutions may require mechanically different pattern/object recognition unless coarser resolution is used to build the OCPs and then the LCs with finer resolution may be able to also recognize the pattern. However, that wastes usable beams on the finer resolution systems.

Non-limiting advantages of the teachings presented herein include providing economic, functional, and usability advantages. For example, the teachings herein describe a simpler, cheaper, more compact design for configuring LCs, laser scanners, and other optical sensing systems. The method and apparatus described herein reduce or eliminate the need for mechanical configuration switches and provide for increased flexibility because the disclosed OCPs allow a user to reconfigure many different settings of optical sensing systems. The method is quite simple and does not require complicated devices or procedures to reconfigure an optical sensing system. In addition, the method requires relatively straightforward software changes in existing optical sensing systems, meaning that existing product models can be upgraded relatively quickly and at low cost.

Broadly, then, as taught herein, a method of configuring an optical sensing system 10 comprises: receiving light at the optical sensing system; detecting that received light data corresponding to the received light exhibits one or more characteristic patterns matching at least one in a set of stored patterns 14 that are maintained in the optical sensing system 10; and selecting an operational configuration of the optical sensing system 10 in dependence on the particular one or more characteristic patterns detected in the received light data. Selecting the operational configuration sets one or more operating parameters that control a behavior of the optical sensing system.

In one or more embodiments, the method includes monitoring a configuration mode signal and entering a configuration mode of operation responsive to the configuration mode signal, and further comprises performing the above-described method only if the light sensing system 10 is in the configuration mode of operation. Additionally, or alternatively, the above-described method's steps of detecting and selecting comprise requiring that the received light data first exhibit a first characteristic pattern that matches a stored master pattern and, only if such a match is detected, entering a configuration mode of the optical sensing system 10 and subsequently monitoring the received light data to detect that the received light data exhibits one or more additional characteristic patterns that match one or more in a stored set of configuration patterns 14.

In the same or other embodiments, the step of detecting comprises detecting that the received light data exhibits a first characteristic pattern at a first time, said first characteristic pattern matching one of the stored patterns, and detecting that the received light data exhibits a second characteristic pattern at a second time that exhibits a characteristic change relative to the first characteristic pattern or that matches another one of the stored patterns, and, if so, selecting the operational configuration of the optical sensing system 10 in dependence on at least one of the first and second characteristic patterns. For example, the system 10 may require that the second pattern be the inverse of the first pattern.

As detailed herein, one or more pattern cards 12 external to the optical sensing system 10 may be used by an operator to produce the first and second characteristic patterns. Advantageously, the method can further include generating an indication to the operator that the first characteristic pattern has been recognized by the optical sensing system, to prompt the operator to change or reconfigure the pattern card, to cause detection by the optical sensing system 10 of the second characteristic pattern. For example, the controller 18 of the optical sensing system 10 may be configured to blink a light or control some other visual or audio indicator, to indicate to the operator that the first and/or second characteristic patterns have been recognized.

Further, as noted for light curtain embodiments, for example, the optical sensing system 10 includes a plurality of light receivers configured to detect light beams. In such embodiments, the step of detecting comprises detecting a characteristic pattern of blocked and unblocked beams. That is, the optical sensing system 10 looks for a characteristic pattern of blocked and unblocked beams in the beam data obtained from its plurality of receivers. In at least one such embodiment, safety and reliability are enhanced in that detecting the characteristic pattern of blocked and unblocked beams includes detecting a start pattern at one or more first beam positions in the received light data, detecting a stop pattern at one or more second beam positions, interpreting the received light data for beam positions between the detected start and stop patterns as a code pattern. Here, the optical sensing system 10 evaluates the code pattern to determine whether it matches one of the stored patterns.

In the same or another light curtain embodiment, the optical sensing system 10 has a plurality of light transmitters configured to transmit the light beams to respective ones of the plurality of light receivers, and the system 10 is configured to verify correct activation of the light transmitters, to ensure a validity of the characteristic pattern detected in the received light data.

In another embodiment, the system 10 is configured to detect and respond to a series of characteristic patterns. For example, a series of consecutive patterns could be used. Doing so allows the system 10 to perform configuration in a hierarchical way. For example, there may be a first pattern to configure blanking options, then a second pattern to configure floating blanking, then a third pattern to configure floating blanking to "x" number of beams.

The configuration process would thus involve the operator presenting the first pattern for recognition by the system 10, then the second pattern, and then the third pattern. (There may be variations of the third pattern, for different numbers of configurations of beams involved in floating blanking.) Also, the system 10 may output visual or other indicators, to prompt the operator to present succeeding patterns in the sequence and/or to indicate that given ones of the patterns have been recognized. Still further, the system 10 may time times between the presentation of specific patterns, such that the system 10 imposes time limits for presentation of the patterns in the sequence. In any case, the use of configuration pattern sequences provides a number of advantages. For example, it allows a reduction in the number of patterns and/or allows complex configuration sequences in short light curtains.

Whether configuring a light curtain, laser scanner, or other type of optical sensing system, the system 10 may be configured to output an indication that a characteristic pattern has been detected. That is, it can be configured to provide a visual, audible, and/or electronic output to indicate that the system 10 has recognized one of the stored configuration (or authorization) patterns in its received light data. This type of output provides positive feedback to the human operator. The system 10 also may output an indication of the selected operational configuration. For example, certain lights or patterns of lights (or colors) may be illuminated to signify enabled/disabled settings, or mode settings, associated with the selected operational configuration.

Further, in one or more embodiments, the optical sensing system 10 comprises a laser scanner configured to scan (e.g., a field of view defining a guarded area) by emitting light pulses, detecting corresponding return reflections, and deriving, as said received light data, distance measurements from the corresponding return reflections. In such embodiments, the step of detecting comprises detecting a characteristic variation in the distance measurements. That is, the system 10 may, for all or a portion of its field of view, evaluate distance measurements to determine the variations in distance exhibited by them.

For example, the step of receiving light comprises scanning a pattern card 12 positioned in a field of view of the laser scanner, wherein the pattern card 12 is configured to cause the laser scanner to detect one or more characteristic patterns of distance measurement variations in the distance measurements obtained by the laser scanner in scanning the pattern card.

In one or more embodiments contemplated herein, the stored patterns (as maintained in the system 10) comprise binary patterns, and the system 10 is configured to quantize the distance measurement variations to obtain a corresponding binary pattern. As such, the system 10 detects distances obtained from a pattern card 12, for example, quantizes the variations in those distances into a binary pattern, and compares the obtained binary pattern to the stored patterns. As one example, the distance obtained from a blocked or reflective portion of a pattern card 12 can be taken by the system 10 as a reference distance. With that approach, any slight variations in detected distance taken for other block/reflective portion(s) of the pattern card 12 are quantized to the same value (e.g., a binary "0"). And the (longer-by-definition) distances recorded for the unblock/non-reflective portion(s) of the pattern card 12 are quantized to another value (e.g., a binary "1").

Thus, the detecting step implemented by the optical sensing system 10 contemplated herein, regardless of whether it is implemented as a laser scanner, may comprise detecting variations in the received light data, quantizing the detected variations into a binary pattern, and comparing that binary pattern to one or more stored binary patterns corresponding to different operational configurations defined for the optical sensing system.

As noted, a variable pattern card 12 or a set of fixed-pattern pattern cards 12 may be used to cause the characteristic configuration (and/or authorization) patterns to be "seen" by the optical sensing system 10. Thus, in at least one embodiment, an overall apparatus contemplated herein comprises an optical sensing system 10 and one or more pattern cards 12. The optical sensing system 10 includes a controller 18 configured to: detect that received light data corresponding to light received by the optical sensing system exhibits one or more characteristic patterns matching at least one in a set of stored patterns maintained in the optical sensing system; and select an operational configuration for the optical sensing system in dependence on the particular one or more characteristic patterns detected in the received light data, wherein selecting the operational configuration sets one or more operating parameters that control a behavior of the optical sensing system.

In complementary fashion, the pattern card 12 has an optical pattern corresponding to one of the stored patterns, such that light received by the optical sensing system from or through the pattern card results in the received light data embodying one of the stored patterns. In at least one such embodiment, the pattern card 12 comprises a body that includes a code section having an optical pattern corresponding to a defined configuration pattern known to the optical sensing system 10, wherein the optical sensing system selects its operational configuration based on the optical pattern detected from the pattern card. The pattern card 12 also includes indicia carried on the pattern card 12, to identify configuration settings of the optical sensing system 10 corresponding to the optical pattern. In at least one such embodiment, again with reference to the example of FIG. 10, the pattern card 12 comprises an assembly of one or more movable elements, such as movable doors, flaps, or apertures, the movement of which changes the optical pattern of the code section, such that the pattern card embodies two or more optical patterns, selectable according to the movable elements. As a general proposition, then, a given pattern card 12 includes one or more movable elements, that are manipulated to set the particular pattern to be presented to the system 10.

With the above non-limiting examples in mind, those skilled in the art will appreciate that the present invention is not limited to the foregoing discussion and accompanying drawings.

What is claimed is:

1. A method of configuring a machine guarding or area monitoring behavior of an optical sensing system that is configured for machine guarding or area monitoring, the method comprising:

receiving light at the optical sensing system;

generating received light data corresponding to the received light;

detecting a pattern embodied in the received light data;

comparing the detected pattern to one or more internally stored patterns, each stored pattern representing a different operational configuration of the optical sensing system; and when the detected pattern is determined to match one of the stored patterns, selecting the operational configuration corresponding to the matched stored pattern, thereby setting one or more operating parameters that control the machine guarding or area monitoring behavior of the optical sensing system.

2. The method of claim 1, further comprising monitoring a configuration mode signal and entering a configuration mode of operation responsive to the configuration mode signal, and further comprising performing the method of claim 1 only if the optical sensing system is in the configuration mode of operation.

3. The method of claim 1, wherein said steps of detecting and comparing comprise requiring that the received light data first exhibit a first characteristic pattern that matches a stored master pattern and, only if such a match is detected, entering a configuration mode of the optical sensing system and subsequently monitoring the received light data to detect that the received light data exhibits one or more additional characteristic patterns that match one or more in a stored set of configuration patterns comprising the one or more internally stored patterns.

4. The method of claim 1, wherein said step of detecting comprises detecting that the received light data exhibits a first characteristic pattern at a first time, said first characteristic pattern matching one of the internally stored patterns, and detecting that the received light data exhibits a second characteristic pattern at a second time that exhibits a characteristic change relative to the first characteristic pattern or that matches another one of the internally stored patterns, and, if so, selecting the operational configuration of the optical sensing system in dependence on at least one of the first and second characteristic patterns.

5. The method of claim 4, wherein one or more pattern cards external to the optical sensing system are used by an operator to produce the first and second characteristic patterns, and further comprising generating an indication to the operator that the first characteristic pattern has been recognized by the optical sensing system, to prompt the operator to change or reconfigure the pattern card, to cause detection by the optical sensing system of the second characteristic pattern.

6. The method of claim 1, wherein said step of detecting comprises detecting that the received light data exhibits a predefined sequence of characteristic patterns corresponding to the internally stored patterns, and wherein said step of selecting the operational configuration corresponding to the matched stored pattern comprises setting the values of one or more configuration parameters of the optical sensing system as a function of the predefined sequence.

7. The method of claim 1, wherein the optical sensing system includes a plurality of light receivers configured to detect light beams, and wherein said step of detecting comprises detecting a characteristic pattern of blocked and unblocked beams.

8. The method of claim 7, wherein said step of detecting the characteristic pattern of blocked and unblocked beams includes detecting a start pattern at one or more first beam positions in the received light data, detecting a stop pattern at one or more second beam positions, interpreting the received light data for beam positions between the detected start and stop patterns as a code pattern, and wherein said step of comparing comprises evaluating the code pattern to determine whether it matches one of the internally stored patterns.

9. The method of claim 7, wherein the optical sensing system comprises a light curtain system having a plurality of light transmitters configured to transmit the light beams to respective ones of the plurality of light receivers, and further comprising verifying correct activation of the light transmitters, to ensure a validity of the characteristic pattern detected in the received light data.

10. The method of claim 1, further comprising outputting from the optical sensing system an indication that the characteristic pattern has been detected.

11. The method of claim 1, further comprising outputting from the optical sensing system an indication of the selected operational configuration.

12. The method of claim 1, wherein the optical sensing system comprises a laser scanner configured to scan by emitting light pulses, detecting corresponding return reflections, and deriving, as said received light data, distance measurements from the corresponding return reflections, and wherein said step of detecting comprises detecting a characteristic variation in the distance measurements.

13. The method of claim 12, wherein said step of receiving light comprises scanning a pattern card positioned in a field of view of the laser scanner, wherein the pattern card is configured to cause the laser scanner to detect one or more characteristic patterns of distance measurement variations in the distance measurements obtained by the laser scanner in scanning the pattern card.

14. The method of claim 12, wherein the stored patterns comprise binary patterns, and further comprising quantizing the distance measurement variations to obtain a corresponding binary pattern, and wherein said step of comparing comprises comparing the obtained binary pattern to the internally stored patterns.

15. The method of claim 1, wherein said step of detecting comprises detecting a pattern of variations in the received light data.

16. The method of claim 15, wherein said detecting the pattern of variations in the received light data comprises detecting variations in the received light data, and quantizing those detected variations into a binary pattern, and wherein said step of comparing comprises comparing that binary pattern to one or more stored binary patterns comprising the internally stored patterns, wherein the one or more stored binary patterns correspond to different operational configurations defined for the optical sensing system.

17. An optical sensing system configured for machine guarding or area monitoring and comprising:

one or more light receivers configured to receive light at the optical sensing system; and a controller configured to:
  detect a pattern embodied in received light data generated from the received light;
  compare the detected pattern to one or more internally stored patterns, each stored pattern representing a different operational configuration of the optical sensing system; and
  when the detected pattern is determined to match one of the stored patterns, select the operational configuration corresponding to the matched stored pattern, thereby setting one or more operating parameters that control the machine guarding or area monitoring behavior of the optical sensing system.

18. The optical sensing system of claim 17, wherein the controller is configured to place the optical sensing system in a configuration mode of operation responsive to a configuration mode signal, and to permit selection of operational configurations only when the optical sensing system is in the configuration mode of operation.

19. The optical sensing system of claim 17, wherein, in being configured to detect the pattern embodied in the received light data and compare the detected pattern, the controller is configured to: require that the received light data first exhibit a first characteristic pattern that matches a stored master pattern, and, only if such a match is detected, to enter into a configuration mode of the optical sensing system; and, wherein, for the configuration mode, the controller is configured to monitor the received light data to detect whether the received light data exhibits one or more additional characteristic patterns that match one or more in a stored set of configuration patterns comprising the internally stored patterns, and, if so, to select a corresponding operational configuration for the optical sensing system.

20. The optical sensing system of claim 17, wherein, in being configured to detect the pattern embodied in the received light data and compare the detected pattern, the controller is configured to detect that the received light data exhibits a first characteristic pattern at a first time, said first characteristic pattern matching one of the internally stored patterns, and detect that the received light data exhibits a second characteristic pattern at a second time, said second characteristic pattern exhibiting a characteristic change relative to the first characteristic pattern or matching another one of the internally stored patterns, and, in response to detecting the first and second characteristic patterns, select the operational configuration of the optical sensing system in dependence on at least one of the first and second characteristic patterns.

21. The optical sensing system of claim 20, wherein one or more pattern cards external to the optical sensing system are used by an operator to produce the first and second characteristic patterns, and wherein the controller is configured to generate an indication to the operator that the first characteristic pattern has been recognized by the optical sensing system, to prompt the operator to change or reconfigure the pattern card, to cause detection by the optical sensing system of the second characteristic pattern.

22. The optical sensing system of claim 17, wherein the controller is configured to detect that the received light data exhibits a predefined sequence of characteristic patterns corresponding to the internally stored patterns, and to select the corresponding operational configuration, including setting one or more configuration parameters of the optical sensing system as a function of the predefined sequence.

23. The optical sensing system of claim 17, wherein the optical sensing system includes a plurality of light receivers configured to detect light beams, and wherein the controller is configured to detect as said pattern embodied in the received light data a characteristic pattern of blocked and unblocked beams.

24. The optical sensing system of claim 23, wherein the controller is configured to detect the characteristic pattern of blocked and unblocked beams by detecting a start pattern at one or more first beam positions in the received light data, detecting a stop pattern at one or more second beam positions, interpreting the received light data for beam positions between the detected start and stop patterns as a code pattern, and evaluating the code pattern to determine whether it matches one of the internally stored patterns.

25. The optical sensing system of claim 24, wherein the optical sensing system comprises a light curtain system having a plurality of light transmitters configured to transmit the light beams to respective ones of the plurality of light receivers, and wherein the controller is configured to verify correct activation of the light transmitters, to ensure a validity of the characteristic pattern detected in the received light data.

26. The optical sensing system of claim 17, wherein the controller is configured to output an indication that the characteristic pattern has been detected.

27. The optical sensing system of claim 17, wherein the controller is configured to output an indication of the selected operational configuration.

28. The optical sensing system of claim 17, wherein the optical sensing system comprises a laser scanner configured to scan by emitting light pulses, detecting corresponding return reflections, and deriving, as said received light data, distance measurements from the corresponding return reflections, and wherein the controller is configured to detect the pattern embodied in the received light data based on being configured to detect a characteristic variation in the distance measurements.

29. The optical sensing system of claim 28, wherein the controller is configured to quantize distance measurement variations observed in the distance measurements obtained by scanning, to form a binary pattern corresponding to the binary pattern of distance measurement variations and to compare the binary pattern to the internally stored patterns.

30. The optical sensing system of claim 17, wherein the controller is configured to detect the pattern embodied in the received light data by detecting variations in the received light data.

31. The optical sensing system of claim 30, wherein the controller is configured to quantize the detected variations into a binary pattern, for comparison to stored binary patterns comprising the internally stored patterns.

32. An apparatus comprising:
  an optical sensing system configured for machine guarding or area monitoring, and which includes one or more light receivers for receiving light, and includes a controller configured to:
    detect that received light data corresponding to light received by the optical sensing system exhibits one or more characteristic patterns matching at least one in a set of stored patterns maintained in the optical sensing system; and
    select an operational configuration for the optical sensing system in dependence on the particular one or more characteristic patterns detected in the received light data, wherein selecting the operational configuration sets one or more operating parameters that control a machine guarding or area monitoring behavior of the optical sensing system; and a pattern card having an optical pattern corresponding to one of the stored patterns, such that light received by the optical sensing system from or through the pattern card results in the received light data embodying one of the stored patterns.

33. A pattern card for configuring an optical sensing system, said pattern card comprising:

a body that includes a code section having an optical pattern corresponding to a defined configuration pattern known to the optical sensing system, wherein the optical sensing system selects its operational configuration based on the optical pattern detected from the pattern card; and indicia carried on the pattern card, to identify configuration settings of the optical sensing system corresponding to the optical pattern.

34. The pattern card of claim 33, wherein the pattern card comprises an assembly of one or more movable elements, the movement of which changes the optical pattern of the code section, such that the pattern card embodies two or more optical patterns, selectable according to the movable elements.

* * * * *